United States Patent
Filson et al.

(10) Patent No.: US 9,494,332 B2
(45) Date of Patent: Nov. 15, 2016

(54) THERMOSTAT WIRING CONNECTOR

(75) Inventors: John Benjamin Filson, Mountain View, CA (US); Daniel Adam Warren, San Francisco, CA (US); Anthony Michael Fadell, Portola Valley, CA (US); Sheng-Nan Yu, New Taipei (TW)

(73) Assignee: Google Inc., Mountain View, CA (US)

( * ) Notice: Subject to any disclaimer, the term of this patent is extended or adjusted under 35 U.S.C. 154(b) by 1438 days.

(21) Appl. No.: 13/034,666

(22) Filed: Feb. 24, 2011

(65) Prior Publication Data
US 2012/0126020 A1 May 24, 2012

Related U.S. Application Data

(60) Provisional application No. 61/415,771, filed on Nov. 19, 2010, provisional application No. 61/429,093, filed on Dec. 31, 2010.

(51) Int. Cl.
*F24F 11/00* (2006.01)
*G05D 23/19* (2006.01)
(Continued)

(52) U.S. Cl.
CPC ....... *F24F 11/0009* (2013.01); *B01D 46/0086* (2013.01); *F24D 19/10* (2013.01); *F24D 19/1084* (2013.01); *F24F 11/001* (2013.01); *F24F 11/006* (2013.01); *F24F 11/0012* (2013.01); *F24F 11/0034* (2013.01); *F24F 11/0086* (2013.01); *F24F 11/02* (2013.01); *G05B 15/02* (2013.01); *G05D 23/19* (2013.01); *G05D 23/1902* (2013.01); *G05D 23/1917* (2013.01); *H04W 4/005* (2013.01); *F24F 2011/0047* (2013.01); *F24F 2011/0052* (2013.01); *F24F 2011/0053* (2013.01); *F24F 2011/0057* (2013.01);
(Continued)

(58) Field of Classification Search
CPC ............ F24F 11/0068; F24F 11/0012; F24F 11/0086; H01R 23/6833
See application file for complete search history.

(56) References Cited

U.S. PATENT DOCUMENTS 1,639,299 A 8/1927 Kinnard
2,101,637 A 12/1937 Howlett
(Continued)

FOREIGN PATENT DOCUMENTS

CN 101305248 A 11/2008
CN 101522447 A 9/2009
(Continued)

OTHER PUBLICATIONS

Aprilaire Electronic Thermostats Model 8355 User's Manual, Research Products Corporation, Dec. 2000, 16 pages.
(Continued)

*Primary Examiner* — M. Alexandra Elve
*Assistant Examiner* — Alexis Cox
(74) *Attorney, Agent, or Firm* — Kilpatirck Townsend & Stockton LLP

(57) ABSTRACT

A thermostat includes a wiring terminal having a moveable component that is actuatable to enable insertion of an HVAC system conductive wire within the wiring terminal. Insertion of the HVAC system conductive wire within the wiring terminal electrically connects the wiring terminal and the HVAC system conductive wire. The actuation of the moveable component opens a loop of an electrical circuit that does not include the HVAC system conductive wire. The loop may enable power harvesting for the thermostat.

12 Claims, 12 Drawing Sheets

(51) Int. Cl.
*F24D 19/10* (2006.01)
*H04W 4/00* (2009.01)
*B01D 46/00* (2006.01)
*G05B 15/02* (2006.01)
*F24F 11/02* (2006.01)

(52) U.S. Cl.
CPC ............... *F24F 2011/0061* (2013.01); *F24F 2011/0063* (2013.01); *F24F 2011/0068* (2013.01); *F24F 2011/0073* (2013.01); *F24F 2011/0075* (2013.01); *F24F 2011/0091* (2013.01); *F24F 2011/0093* (2013.01); *F24F 2011/0094* (2013.01); *Y02B 10/20* (2013.01); *Y02B 10/70* (2013.01); *Y02B 60/50* (2013.01); *Y10T 29/49826* (2015.01)

(56) References Cited

U.S. PATENT DOCUMENTS

| | | | |
|---|---|---|---|
| 2,492,774 A | 12/1949 | Wild | |
| 3,025,484 A | 3/1962 | Cunningham | |
| 3,948,441 A | 4/1976 | Perkins et al. | |
| 3,991,357 A | 11/1976 | Kaminski | |
| 4,049,973 A | 9/1977 | Lambert | |
| 4,157,506 A | 6/1979 | Spencer | |
| 4,177,923 A | 12/1979 | Krump | |
| 4,249,696 A | 2/1981 | Donnelly et al. | |
| 4,308,991 A | 1/1982 | Peinetti et al. | |
| 4,460,125 A | 7/1984 | Barker et al. | |
| 4,528,459 A | 7/1985 | Wiegel | |
| 4,632,303 A | 12/1986 | Rodittis | |
| 4,695,246 A | 9/1987 | Beilfuss et al. | |
| 4,798,971 A | 1/1989 | Gravely | |
| 4,842,510 A | 6/1989 | Grunden et al. | |
| 4,872,828 A | 10/1989 | Mierzwinski et al. | |
| 4,898,229 A | 2/1990 | Brown et al. | |
| 4,948,040 A | 8/1990 | Kobayashi et al. | |
| 4,948,044 A | 8/1990 | Cacciatore | |
| 4,955,806 A | 9/1990 | Grunden et al. | |
| 5,065,813 A | 11/1991 | Berkeley et al. | |
| 5,107,918 A | 4/1992 | McFarlane et al. | |
| 5,127,464 A | 7/1992 | Butler et al. | |
| 5,158,477 A | 10/1992 | Testa et al. | |
| 5,161,606 A | 11/1992 | Berkeley et al. | |
| 5,175,439 A | 12/1992 | Haerer et al. | |
| 5,181,389 A | 1/1993 | Hanson et al. | |
| 5,251,813 A | 10/1993 | Kniepkamp | |
| 5,255,179 A | 10/1993 | Zekan et al. | |
| 5,260,669 A | 11/1993 | Higgins et al. | |
| 5,277,363 A | 1/1994 | Hart | |
| 5,318,224 A | 6/1994 | Darby et al. | |
| 5,347,982 A | 9/1994 | Binzer et al. | |
| 5,352,930 A | 10/1994 | Ratz | |
| 5,381,950 A | 1/1995 | Aldridge | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,485,953 A | 1/1996 | Bassett et al. | |
| 5,506,569 A | 4/1996 | Rowlette | |
| 5,544,036 A | 8/1996 | Brown, Jr. et al. | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,646,349 A | 7/1997 | Twigg et al. | |
| 5,655,709 A | 8/1997 | Garnett et al. | |
| 5,673,850 A | 10/1997 | Uptegraph | |
| 5,697,552 A | 12/1997 | McHugh et al. | |
| 5,736,795 A | 4/1998 | Zuehlke et al. | |
| 5,808,294 A | 9/1998 | Neumann | |
| 5,903,139 A | 5/1999 | Kompelien | |
| 5,918,474 A | 7/1999 | Khanpara et al. | |
| 5,931,378 A | 8/1999 | Schramm | |
| 5,950,709 A | 9/1999 | Krueger et al. | |
| 5,957,374 A | 9/1999 | Bias et al. | |
| 6,032,867 A | 3/2000 | Dushane et al. | |
| 6,060,719 A | 5/2000 | DiTucci et al. | |
| 6,072,784 A | 6/2000 | Agrawal et al. | |
| 6,084,518 A | 7/2000 | Jamieson | |
| 6,089,310 A | 7/2000 | Toth et al. | |
| 6,102,749 A | 8/2000 | Lynn et al. | |
| D435,473 S | 12/2000 | Eckel et al. | |
| 6,196,468 B1 | 3/2001 | Young | |
| 6,207,899 B1 | 3/2001 | Gillespie | |
| 6,213,404 B1 | 4/2001 | Dushane et al. | |
| 6,222,719 B1 | 4/2001 | Kadah | |
| 6,275,160 B1 | 8/2001 | Ha | |
| 6,295,823 B1 | 10/2001 | Odom et al. | |
| 6,315,211 B1 | 11/2001 | Sartain et al. | |
| 6,336,593 B1 | 1/2002 | Bhatnagar | |
| 6,347,747 B1 | 2/2002 | Nesbitt | |
| 6,356,038 B2 | 3/2002 | Bishel | |
| 6,437,999 B1 | 8/2002 | Wittenbreder | |
| 6,509,838 B1 | 1/2003 | Payne et al. | |
| 6,513,723 B1 | 2/2003 | Mueller et al. | |
| 6,560,977 B1 | 5/2003 | Hupfel et al. | |
| 6,566,768 B2 | 5/2003 | Zimmerman et al. | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,794,771 B2 | 9/2004 | Orloff | |
| 6,798,341 B1 | 9/2004 | Eckel et al. | |
| 6,804,117 B2 | 10/2004 | Phillips et al. | |
| 6,826,454 B2 | 11/2004 | Sulfstede | |
| 6,851,621 B1 | 2/2005 | Wacker et al. | |
| 6,851,967 B2 | 2/2005 | Miyoshi et al. | |
| 6,886,754 B2 | 5/2005 | Smith et al. | |
| 6,888,078 B2 | 5/2005 | Loeffelholz et al. | |
| 6,888,441 B2 | 5/2005 | Carey | |
| 6,933,655 B2 | 8/2005 | Morrison et al. | |
| 6,956,463 B2 | 10/2005 | Crenella et al. | |
| 6,997,390 B2 | 2/2006 | Alles | |
| 7,055,759 B2 | 6/2006 | Wacker et al. | |
| 7,083,109 B2 | 8/2006 | Pouchak | |
| 7,156,318 B1 | 1/2007 | Rosen | |
| 7,167,079 B2 | 1/2007 | Smyth et al. | |
| 7,174,239 B2 | 2/2007 | Butler et al. | |
| 7,181,317 B2 | 2/2007 | Amundson et al. | |
| 7,200,467 B2 | 4/2007 | Schanin et al. | |
| 7,209,870 B2 | 4/2007 | Simmons et al. | |
| 7,331,852 B2 | 2/2008 | Ezell et al. | |
| 7,360,370 B2 | 4/2008 | Shah et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,555,364 B2 | 6/2009 | Poth et al. | |
| 7,562,536 B2 | 7/2009 | Harrod et al. | |
| 7,566,263 B2 | 7/2009 | Snyder | |
| 7,571,865 B2 | 8/2009 | Nicodem et al. | |
| 7,634,504 B2 | 12/2009 | Amundson | |
| 7,648,077 B2 | 1/2010 | Rossi et al. | |
| 7,673,809 B2 | 3/2010 | Juntunen | |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,809,472 B1 | 10/2010 | Silva et al. | |
| 7,821,218 B2 | 10/2010 | Butler et al. | |
| 7,841,542 B1 | 11/2010 | Rosen | |
| 7,844,764 B2 | 11/2010 | Williams | |
| 7,845,576 B2 | 12/2010 | Siddaramanna et al. | |
| 7,847,681 B2 | 12/2010 | Singhal et al. | |
| 7,900,849 B2 | 3/2011 | Barton et al. | |
| 7,904,209 B2 | 3/2011 | Podgorny et al. | |
| 7,904,830 B2 | 3/2011 | Hoglund et al. | |
| 8,067,912 B2 | 11/2011 | Mullin | |
| D651,529 S | 1/2012 | Mongell et al. | |
| 8,091,375 B2 | 1/2012 | Crawford | |
| 8,195,313 B1 | 6/2012 | Fadell et al. | |
| 8,265,798 B2 | 9/2012 | Imes | |
| 8,280,536 B1 | 10/2012 | Fadell et al. | |
| 8,415,829 B2 | 4/2013 | Di Cristofaro | |

(56) References Cited

U.S. PATENT DOCUMENTS

| | | |
|---|---|---|
| 8,442,695 B2 | 5/2013 | Imes et al. |
| 8,544,285 B2 | 10/2013 | Stefanski et al. |
| 8,708,242 B2 | 4/2014 | Conner et al. |
| 2002/0074865 A1 | 6/2002 | Zimmerman et al. |
| 2003/0037555 A1 | 2/2003 | Street et al. |
| 2003/0064335 A1 | 4/2003 | Canon |
| 2003/0069648 A1 | 4/2003 | Douglas et al. |
| 2003/0090243 A1 | 5/2003 | Atherton |
| 2003/0231001 A1 | 12/2003 | Bruning |
| 2004/0058637 A1 | 3/2004 | Laiti |
| 2004/0120084 A1 | 6/2004 | Readio et al. |
| 2004/0130454 A1 | 7/2004 | Barton |
| 2004/0193324 A1 | 9/2004 | Hoog et al. |
| 2004/0209209 A1 | 10/2004 | Chodacki et al. |
| 2004/0238651 A1 | 12/2004 | Juntunen et al. |
| 2004/0245349 A1 | 12/2004 | Smith |
| 2004/0245352 A1 | 12/2004 | Smith |
| 2005/0040250 A1 | 2/2005 | Wruck |
| 2005/0043907 A1 | 2/2005 | Eckel et al. |
| 2005/0080493 A1 | 4/2005 | Arntson |
| 2005/0145705 A1 | 7/2005 | Shah et al. |
| 2005/0159846 A1 | 7/2005 | Van Ostrand et al. |
| 2005/0159847 A1 | 7/2005 | Shah et al. |
| 2005/0195757 A1 | 9/2005 | Kidder et al. |
| 2005/0270151 A1 | 12/2005 | Winick |
| 2006/0090066 A1 | 4/2006 | Maze et al. |
| 2006/0102731 A1 | 5/2006 | Mueller et al. |
| 2006/0102732 A1 | 5/2006 | Garrett et al. |
| 2006/0124759 A1 | 6/2006 | Rossi et al. |
| 2006/0186214 A1 | 8/2006 | Simon et al. |
| 2006/0196953 A1 | 9/2006 | Simon et al. |
| 2006/0219799 A1 | 10/2006 | Schultz et al. |
| 2007/0045432 A1 | 3/2007 | Juntunen |
| 2007/0045433 A1 | 3/2007 | Chapman et al. |
| 2007/0045441 A1 | 3/2007 | Ashworth et al. |
| 2007/0095082 A1 | 5/2007 | Garrett et al. |
| 2007/0103824 A1 | 5/2007 | Patterson et al. |
| 2007/0114848 A1 | 5/2007 | Mulhouse et al. |
| 2007/0115135 A1 | 5/2007 | Mulhouse et al. |
| 2007/0131787 A1 | 6/2007 | Rossi et al. |
| 2007/0132503 A1 | 6/2007 | Nordin |
| 2007/0157639 A1 | 7/2007 | Harrod |
| 2007/0158442 A1 | 7/2007 | Chapman et al. |
| 2007/0183475 A1 | 8/2007 | Hutcherson |
| 2007/0183478 A1 | 8/2007 | Becker et al. |
| 2007/0205297 A1 | 9/2007 | Finkam et al. |
| 2007/0208461 A1 | 9/2007 | Chase |
| 2007/0221741 A1 | 9/2007 | Wagner et al. |
| 2007/0227862 A1 | 10/2007 | Yim et al. |
| 2007/0228183 A1 | 10/2007 | Kennedy et al. |
| 2007/0241203 A1 | 10/2007 | Wagner et al. |
| 2007/0272527 A1 | 11/2007 | Mattlar et al. |
| 2007/0296280 A1 | 12/2007 | Sorg et al. |
| 2008/0006709 A1 | 1/2008 | Ashworth et al. |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0094010 A1 | 4/2008 | Black |
| 2008/0099568 A1 | 5/2008 | Nicodem et al. |
| 2008/0128523 A1 | 6/2008 | Hoglund et al. |
| 2008/0133956 A1 | 6/2008 | Fadell |
| 2008/0142344 A1 | 6/2008 | Hickam |
| 2008/0147242 A1 | 6/2008 | Roher et al. |
| 2008/0151458 A1 | 6/2008 | Beland et al. |
| 2008/0161977 A1 | 7/2008 | Takach et al. |
| 2008/0179412 A1 | 7/2008 | Rhodes |
| 2008/0183335 A1 | 7/2008 | Poth et al. |
| 2008/0185450 A1 | 8/2008 | Kwon et al. |
| 2008/0202135 A1 | 8/2008 | Francis |
| 2008/0238660 A1 | 10/2008 | Dayton et al. |
| 2008/0273754 A1 | 11/2008 | Hick et al. |
| 2009/0012959 A1 | 1/2009 | Ylivainio et al. |
| 2009/0057425 A1 | 3/2009 | Sullivan et al. |
| 2009/0065595 A1 | 3/2009 | Kates |
| 2009/0099697 A1 | 4/2009 | Li et al. |
| 2009/0140056 A1 | 6/2009 | Leen |
| 2009/0140057 A1 | 6/2009 | Leen |
| 2009/0140064 A1 | 6/2009 | Schultz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0194601 A1 | 8/2009 | Flohr |
| 2009/0195349 A1 | 8/2009 | Frader-Thompson et al. |
| 2009/0236433 A1 | 9/2009 | Mueller et al. |
| 2009/0259713 A1 | 10/2009 | Blumrich et al. |
| 2009/0261174 A1 | 10/2009 | Butler et al. |
| 2009/0312968 A1 | 12/2009 | Phillips |
| 2010/0000239 A1 | 1/2010 | Lifson et al. |
| 2010/0006660 A1 | 1/2010 | Leen et al. |
| 2010/0012737 A1 | 1/2010 | Kates |
| 2010/0025483 A1 | 2/2010 | Hoeynck et al. |
| 2010/0070089 A1 | 3/2010 | Harrod et al. |
| 2010/0070099 A1 | 3/2010 | Watson et al. |
| 2010/0076605 A1 | 3/2010 | Harrod et al. |
| 2010/0084482 A1 | 4/2010 | Kennedy et al. |
| 2010/0084918 A1 | 4/2010 | Fells et al. |
| 2010/0106305 A1 | 4/2010 | Pavlak et al. |
| 2010/0106322 A1 | 4/2010 | Grohman |
| 2010/0114382 A1 | 5/2010 | Ha et al. |
| 2010/0131112 A1 | 5/2010 | Amundson et al. |
| 2010/0163635 A1 | 7/2010 | Ye |
| 2010/0182743 A1 | 7/2010 | Roher |
| 2010/0193592 A1 | 8/2010 | Simon et al. |
| 2010/0198425 A1 | 8/2010 | Donovan |
| 2010/0250009 A1 | 9/2010 | Lifson et al. |
| 2010/0261465 A1 | 10/2010 | Rhoads et al. |
| 2010/0298985 A1 | 11/2010 | Hess et al. |
| 2010/0318227 A1 | 12/2010 | Steinberg et al. |
| 2011/0015798 A1 | 1/2011 | Golden et al. |
| 2011/0015802 A1 | 1/2011 | Imes |
| 2011/0025257 A1 | 2/2011 | Weng |
| 2011/0137467 A1 | 6/2011 | Leen et al. |
| 2011/0152024 A1 | 6/2011 | Kuehl |
| 2011/0160918 A1 | 6/2011 | McMasters et al. |
| 2011/0166712 A1 | 7/2011 | Kramer et al. |
| 2011/0241624 A1 | 10/2011 | Park et al. |
| 2011/0253796 A1 | 10/2011 | Posa et al. |
| 2012/0017611 A1 | 1/2012 | Coffel et al. |
| 2012/0024969 A1 | 2/2012 | Kates |
| 2012/0031984 A1 | 2/2012 | Feldmeier et al. |
| 2012/0126019 A1 | 5/2012 | Warren et al. |
| 2012/0126020 A1 | 5/2012 | Filson et al. |
| 2012/0248211 A1 | 10/2012 | Warren et al. |
| 2012/0258776 A1 | 10/2012 | Lord et al. |
| 2012/0273580 A1 | 11/2012 | Warren et al. |
| 2013/0073506 A1 | 3/2013 | Camp et al. |
| 2013/0087629 A1 | 4/2013 | Stefanski et al. |
| 2014/0084072 A1 | 3/2014 | Conner et al. |
| 2015/0293541 A1 | 10/2015 | Fadell et al. |

FOREIGN PATENT DOCUMENTS

| | | |
|---|---|---|
| CN | 101849311 A | 9/2010 |
| EP | 207295 A1 | 1/1987 |
| EP | 447458 | 9/1991 |
| EP | 510807 | 10/1992 |
| EP | 660287 | 6/1995 |
| EP | 690363 | 1/1996 |
| EP | 2302326 | 3/2011 |
| GB | 2294828 A | 5/1996 |
| JP | 09298780 | 11/1997 |
| SI | 20556 | 10/2001 |
| TW | 274364 | 4/1996 |
| TW | 316955 | 10/1997 |
| TW | 362230 | 6/1999 |
| TW | 532469 | 5/2003 |
| TW | 535320 B | 6/2003 |
| TW | 2007009529 | 3/2007 |
| TW | 201232994 A | 8/2012 |
| WO | 2005019740 | 3/2005 |
| WO | 2007027554 | 3/2007 |

(56) References Cited

FOREIGN PATENT DOCUMENTS

| WO | 2008054938 | | 5/2008 |
|---|---|---|---|
| WO | 2012068437 | A3 | 5/2012 |
| WO | 2013058820 | A1 | 4/2013 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Bryant, SYSTXBBUID01 Evolution Control Installation Instructions, 2004, 12 pages.
Ecobee Smart Thermostat Installation Manual, Jun. 29, 2011, 20 pages.
Ecobee Smart Thermostat User Manual, May 11, 2010, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
TB-PAC, TB-PHP, Base Series Programmable Thermostats, Carrier Corp, May 14, 2012, 8 pages.
TP-PAC, TP-PHP, TP-NAC, TP-NHP Performance Series AC/HP Thermostat Installation Instructions, Carrier Corp, 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
International Patent Application No. PCT/US2011/061391, International Search Report, mailed Apr. 11, 2012, 3 pages.
Arens et al., Demand Response Electrical Appliance Manager—User Interface Design, Development and Testing, Poster, Demand Response Enabling Technology Development, University of California Berkeley, 2005, 1 page.
Arens et al., Demand Response Enabled Thermostat—Control Strategies and Interface, Demand Response Enabling Technology Development Poster, University of California Berkeley, 2004, 1 page.
Arens et al., Demand Response Enabling Technology Development, Phase I Report: Jun. 2003-Nov. 2005, University of California Berkeley, Apr. 4, 2006, pp. 1-108.
Arens et al., New Thermostat Demand Response Enabling Technology, Poster, University of California Berkeley, Jun. 10, 2004.
Auslander et al., UC Berkeley DR Research Energy Management Group, Power Point Presentation, DR ETD Workshop, State of California Energy Commission, Jun. 11, 2007, pp. 1-35.
Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.
Detroitborg, Nest Learning Thermostat: Unboxing and Review, [online], retrieved from the Internet: <URL: http://www.youtube.com/watch?v=KrgcOL4oLzc> [retrieved on Aug. 22, 2013], Feb. 10, 2012, 4 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Energy Joule, Ambient Devices, retrieved from the Internet: <URL: http://web.archive.org/web/20110723210421/http://www.ambientdevices.com/products/energyjoule.html> [retrieved on Aug. 1, 2012], Jul. 23, 2011, 2 pages.
Green, Thermo Heat Tech Cool, Popular Mechanics Electronic Thermostat Guide, Oct. 1985, pp. 155-158.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Prestige THX9321 and THX9421 Product Data, Honeywell International, Inc., Jan. 12, 2012, 126 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
ICY 3815TT-001 Timer-Thermostat Package Box, ICY BV Product Bar Code No. 8717953007902, 2009, 2 pages.
Installation and Start-Up Instructions Evolution Control SYSTXBBUID01, Bryant Heating & Cooling Systems, 2004, 12 pages.
Meier et al., Thermostat Interface Usability: A Survey, Ernest Orlando Lawrence Berkeley National Laboratory, Environmental Energy Technologies Division, Berkeley California, Sep. 2010, pp. 1-73.
Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley, 2008, pp. 7-242 through 7-253.
Peffer et al., Smart Comfort at Home: Design of a Residential Thermostat to Achieve Thermal Comfort, and Save Money and Peak Energy, University of California Berkeley, Mar. 2007, 1 page.
Salus, S-Series Digital Thermostat Instruction Manual-ST620 Model No. Instruction Manual, www.salus-tech.com, Version 005, Apr. 29, 2010, 24 pages.
Sanford, iPod (Click Wheel) (2004), www.apple-history.com, retrieved from: http://apple-history.com/ipod [retrieved on Apr. 9, 2012], 2 pages.
Shadrach, Energy Scavenging for Wireless Sensor Nodes with a Focus on Vibration to Electricity Conversion, Dissertation [online], retrieved from the Internet: <URL: http://users.cecs.anu.edu.au/~Shad.Roundy/paper/ShadThesis.pdf>, Jun. 2003, 297 pages.
The Clever Thermostat, ICY BV Web Page, http://www.icy.nl/en/consumer/products/clever-thermostat, ICY BV, 2012, 1 page.

(56) References Cited

OTHER PUBLICATIONS

The Clever Thermostat User Manual and Installation Guide, ICY BV ICY3815 Timer-Thermostat, 2009, pp. 1-36.
Wright, et al., DR ETD—Summary of New Thermostat, TempNode, & New Meter (UC Berkeley Project), Power Point Presentation, Public Interest Energy Research, University of California Berkeley, 2005, pp. 1-49.
ISR/WO mailed on Apr. 3, 2012 for International Patent Application No. PCT/US2011/061339 filed on Nov. 18, 2011, all pages.
ISR/WO mailed on Jul. 6, 2012 for International Patent Application No. PCT/US2012/030084 filed on Mar. 22, 2012, all pages.
International Preliminary Report on Patentability mailed on May 1, 2014 for International Patent Application No. PCT/US2012/030084 filed on Mar. 22, 2012, all pages.
ISR/WO mailed on Jan. 22, 2013 for International Patent Application No. PCT/US2012/061148 filed on Oct. 19, 2012, all pages.
Taiwanese Office Action issued on Mar. 18, 2014 for ROC (Taiwan) Patent Application No. 100142429 filed on Nov. 8, 2011, all pages.
Taiwanese Office Action issued on Sep. 30, 2014 for ROC (Taiwan) Patent Application No. 100142428 filed on Nov. 18, 2011, all pages.
U.S. Appl. No. 60/512,886, Volkswagen Rotary Knob for Motor Vehicle—English Translation of German Application filed Oct. 20, 2003, all pages.
U.S. Patent Office Action issued on Dec. 23, 2014 for U.S. Appl. No. 14/504,220 filed on Oct. 1, 2014, all pages.
Written Opinion mailed Apr. 11, 2012 for International Patent Application PCT/US2011/061391 filed Nov. 18, 2011, 5 pages.
International Preliminary Report on Patentability issued Feb. 25, 2014 for International Patent Application PCT/US2011/061391 filed Nov. 18, 2011, 6 pages.
International Preliminary Report on Patentability mailed on May 30, 2013, for International Patent Application No. PCT/US2011/061339, filed Nov. 18, 2011, 8 pages.
International Preliminary Report on Patentability mailed May 1, 2014, for International Patent Application No. PCT/US2012/061148, filed Oct. 19, 2012, 10 pages.
Taiwanese Office Action issued on May 5, 2014, for ROC (Taiwan) Patent Application No. 100142428 filed on Nov. 18, 2011, 12 pages.
Honeywell Prestige IAQ Product Data 2, Honeywell International, Inc., Jan. 12, 2012, 126 pages.

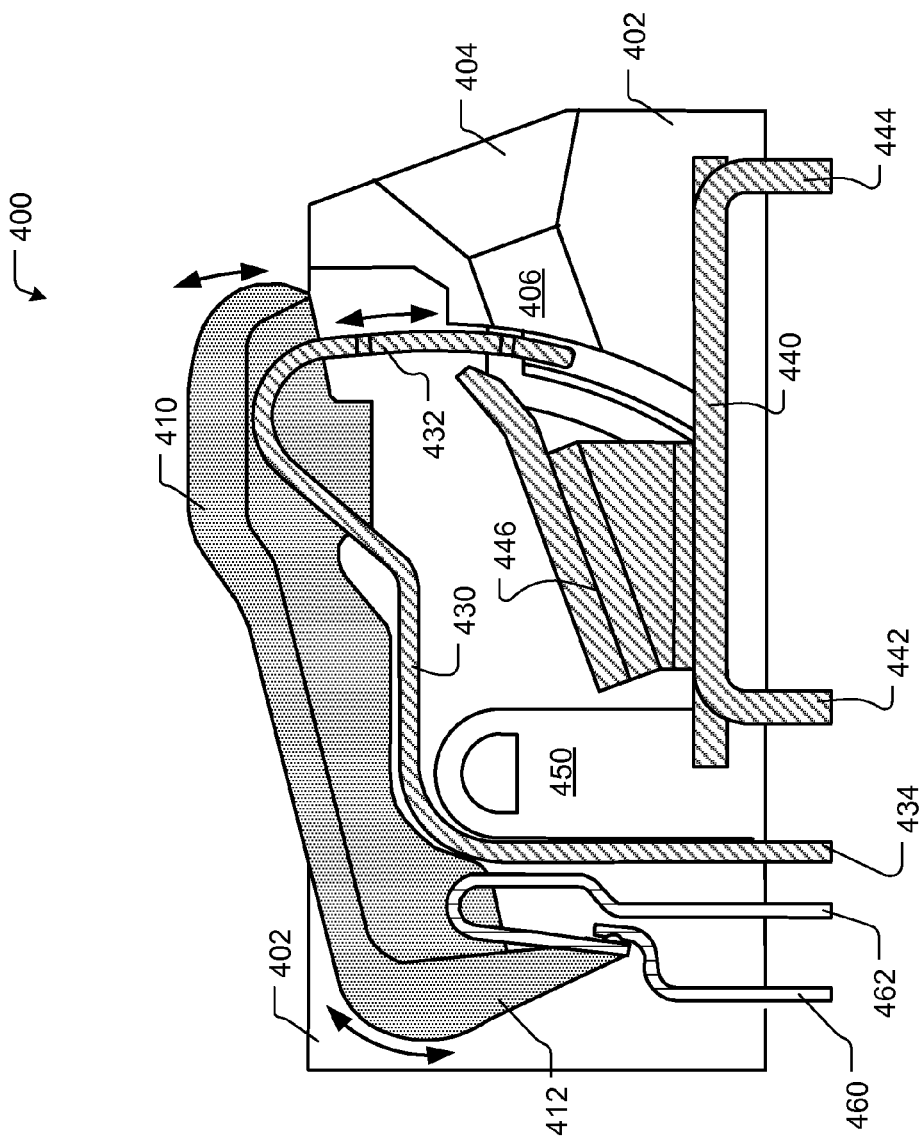

THERMOSTAT WIRING CONNECTOR

CROSS-REFERENCE TO RELATED APPLICATIONS

This patent application claims the benefit of U.S. Prov. Ser. No. 61/415,771 filed Nov. 19, 2010; and of U.S. Prov. Ser. No. 61/429,093 filed Dec. 31, 2010. The subject matter of this patent application also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; U.S. Ser. No. 12/987,257 filed Jan. 10, 2011; U.S. Ser. No. 13/034,674, entitled "Thermostat Circuitry for Connection to HVAC Systems," filed Feb. 24, 2011; and U.S. Ser. No. 13/034,678, entitled "Thermostat Battery Recharging During HVAC Function Active and Inactive States," filed Feb. 24, 2011. Each of the above-referenced patent applications is incorporated by reference herein.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention generally relates to control systems for heating, ventilation and air conditioning (HVAC) systems. More particularly, embodiments of this invention relate to wiring connectors for use in HVAC system thermostats.

As is known, for example as discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two external connections required.

When electronics began to be used in thermostats the fact that the thermostat was not directly wired to both sides of the transformer for its power source created a problem. This meant either the thermostat had to have its own independent power source, such as a battery, or be hardwired directly from the system transformer. Direct hardwiring a "common" wire from the transformer to the electronic thermostat may be very difficult and costly. However, there are also disadvantages to using a battery for providing the operating power. One primary disadvantage is the need to continually check and replace the battery. If the battery is not properly replaced and cannot provide adequate power, the electronic thermostat may fail during a period of extreme environmental conditions.

Since many households did not have a direct wire from the system transformer (such as a "Common" wire), some thermostats have been designed to derive power from the transformer through the equipment load. The methods for powering an electronic thermostat from the transformer with a single direct wire connection to the transformer is called "power stealing" or "power sharing." The thermostat "steals," "shares" or "harvests" its power during the "OFF" periods of the heating or cooling system by allowing a small amount of current to flow through it into the load coil below its response threshold (even at maximum transformer output voltage). During the "ON" periods of the heating or cooling system the thermostat draws power by allowing a small voltage drop across itself. Hopefully, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore always rely on power stealing or must use disposable batteries.

SUMMARY

According to some embodiments a thermostat is provided for controlling HVAC systems. The thermostat includes one or more wiring terminals each adapted and configured to make an electrical connection with an HVAC system conductive wire. The making of the connection with the HVAC system wire actuates switching in a loop of an electrical circuit that does not include the HVAC system conductive wire. According to some embodiments, making the connection with the HVAC wire switches open the loop, and the loop is used for power harvesting. For example the loop can include an HVAC wire for a controlling part of a cooling system and/or part of a heating system, and the wire connected to the terminal can be a common wire. According to some embodiments the making of the connection is used to electronically sense the presence of the HVAC wire. According to some embodiments, the making of the connection is used to automatically isolate Rc and Rh wires from each other when both are present. According to some embodiments, the wiring terminal includes actuation of a moveable part of the terminal so as to accommodate the HVAC system wire that in turn actuates the switching of the loop. According to some embodiments the wiring terminal actuates switching in more than one other loops. According to some embodiments the thermostat is primarily designed for controlling residential, and/or light commercial HVAC systems. According to some embodiments, the HVAC system has a cooling capacity of less than about five tones.

According to some embodiments a method of installing a thermostat in an HVAC system is provided. The method includes connecting an HVAC system conductive wire to a terminal in the thermostat; and, in response to the connecting, automatically actuating switching in a loop of an electrical circuit that does not include the HVAC system conductive wire.

According to some embodiments, a thermostat for controlling an HVAC system is provided that includes a wiring terminal adapted and configured to make an electrical connection with an HVAC system conductive wire, wherein connecting the HVAC system wire causes switching open of a loop of an electrical circuit used for power harvesting.

According to some embodiments, a wiring terminal for connecting to a conductive wire is provided. The terminal includes an opening to accept the conductor by actuating a moveable portion of the terminal so as to accommodate the conductive wire, wherein the actuating of the moveable portion actuates switching a loop of an electrical circuit that does not include the conductive wire.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "HVAC" includes systems providing both heating and cooling, heating only, cooling only, as well as systems that provide other occupant comfort and/or conditioning functionality such as humidification, dehumidification and ventilation.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "common wire" when referring to HVAC systems refers to a direct wire from an HVAC power transformer that is in addition to the power or return wire to the transformer. Thus, power can be drawn from a circuit including the common wire and the power or return wire without risk of switching on or off relays, switches and/or contactors for operating various HVAC systems since those switching means are not in series in such a circuit.

As used herein the term "silent" or "silently" when referring to thermostat operation and/or control means that any sound made by the thermostat is generally inaudible to the human ear at a range of greater than 1 meter.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 4A, 4B and 4C show a thermostat connector with automatic switching of independent circuits, according to some embodiments;

FIGS. 7C-D illustrate further detail for terminal blocks, according to some embodiments;

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
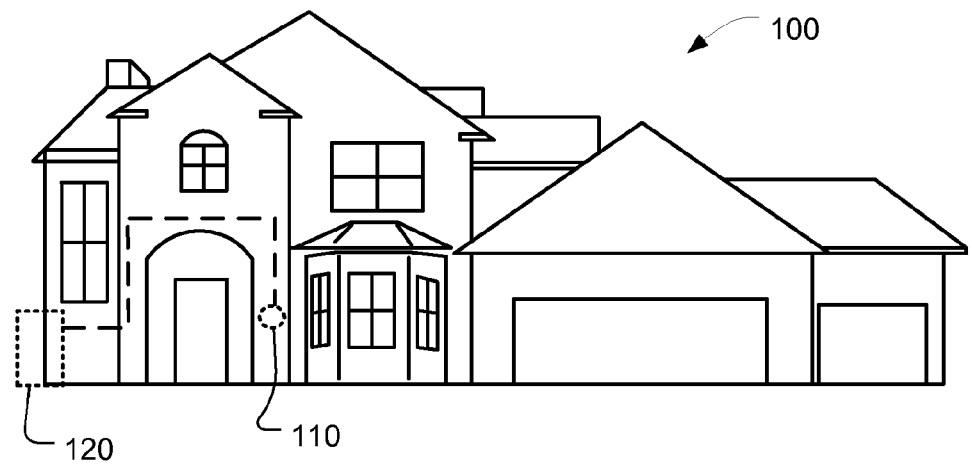
FIG. 1 is a diagram of an enclosure for which thermodynamic behavior is predicted, according to some embodiments.

FIG. 1 is a diagram of an enclosure for which thermodynamic behavior is predicted, according to some embodiments. Enclosure 100, in this example is a single-family dwelling According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons.

Figure 2:
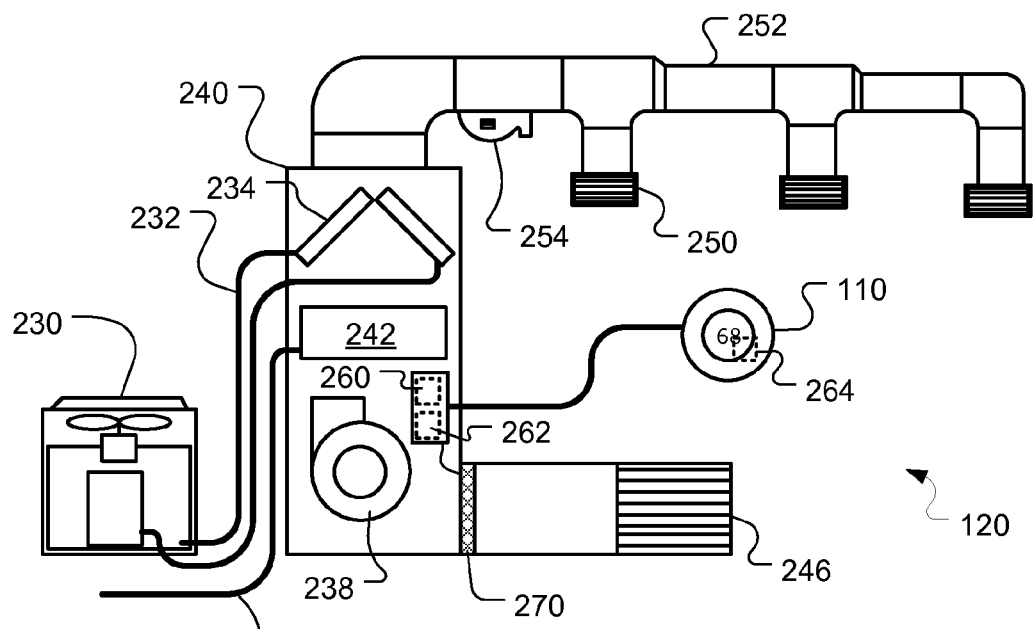
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used such as hydronic, in-floor radiant heating, heat pump, etc. In heating, heating coils or elements 242 within air handler 240 provide a source of heat using electricity or gas via line 236. Cool air is drawn from the enclosure via return air duct 246 through fan 238 and is heated heating coils or elements 242. The heated air flows back into the enclosure at one or more locations via supply air duct system 252 and supply air grills such as grill 250. In cooling an outside compressor 230 passes gas such as Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Thermostat 110 also includes a processing system 264 such as a microprocessor that is adapted and programmed to controlling the HVAC system and to carry out the techniques described in detail herein. Although not shown in FIG. 2, according to some embodiments the HVAC system has other known functionality such as venting air to and from the outside, and one or more dampers to control airflow within the duct systems.

Thermostat 110 controls the HVAC system 120 through a number of control circuits. In particular, there are often separate control systems for heating and cooling. The heating system can include a low voltage, for example 24 VAC, operated gas valve which controls the flow of gas to the furnace; the cooling system includes a contactor having a low-voltage coil and high-voltage contacts which control energizing of the compressor; and the circulation system includes a fan relay having a low-voltage coil and high-voltage contacts which control energizing of the fan which circulates the conditioned air. The electrical power for energizing such low-voltage operated devices is provided either by a single transformer 260 for both heating and cooling, or by two separate transformers 260 for heating and 262 for cooling. Often, a single transformer is provided when the heating and cooling system is installed as a complete unit. If the cooling system is added to an existing heating system, sometimes an additional transformer is used.

An electronic programmable thermostat that requires power from the HVAC system is provided. The thermostat is flexible in that it can be installed in buildings having different types of HVAC systems. In particular, the thermostat can be wired directly to an HVAC system having a common wire, so that the thermostat can draw power directly from the power transformer, it can be wired to an HVAC system which does not have a common wire, so the thermostat can draw power using power harvesting circuitry from the HVAC system control loops. In order to have a single thermostat that can be connected to either type of HVAC system (i.e. with our without a common wire), the thermostat must detect which power sources are present and then draw power from the best available power source.

Figure 3A:
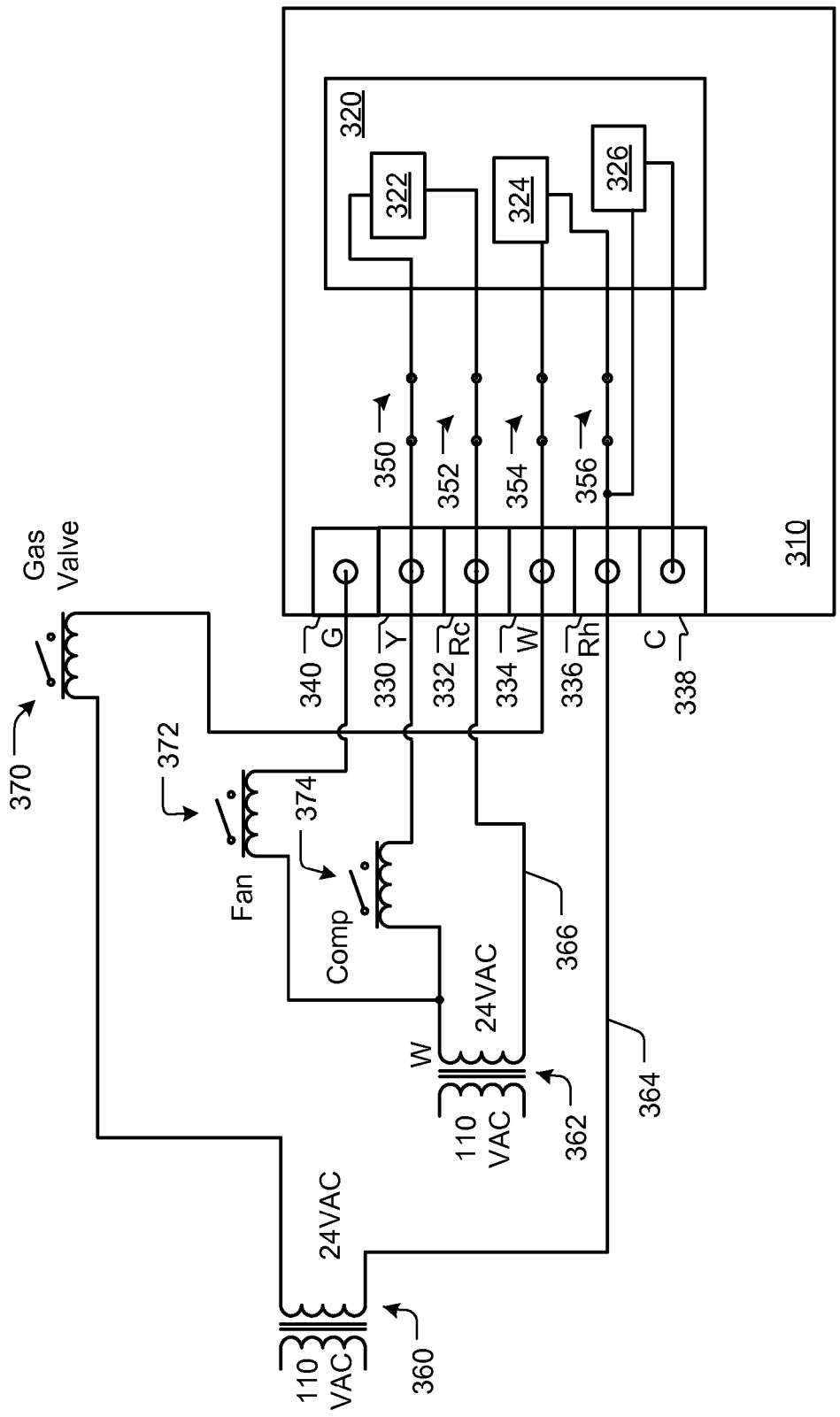
FIGS. 3A and 3B are schematic diagrams of a thermostat installed in an HVAC system not having an available common wire, and in an HVAC system having an available common wire, respectively, according to some embodiments.
Figure 3B:
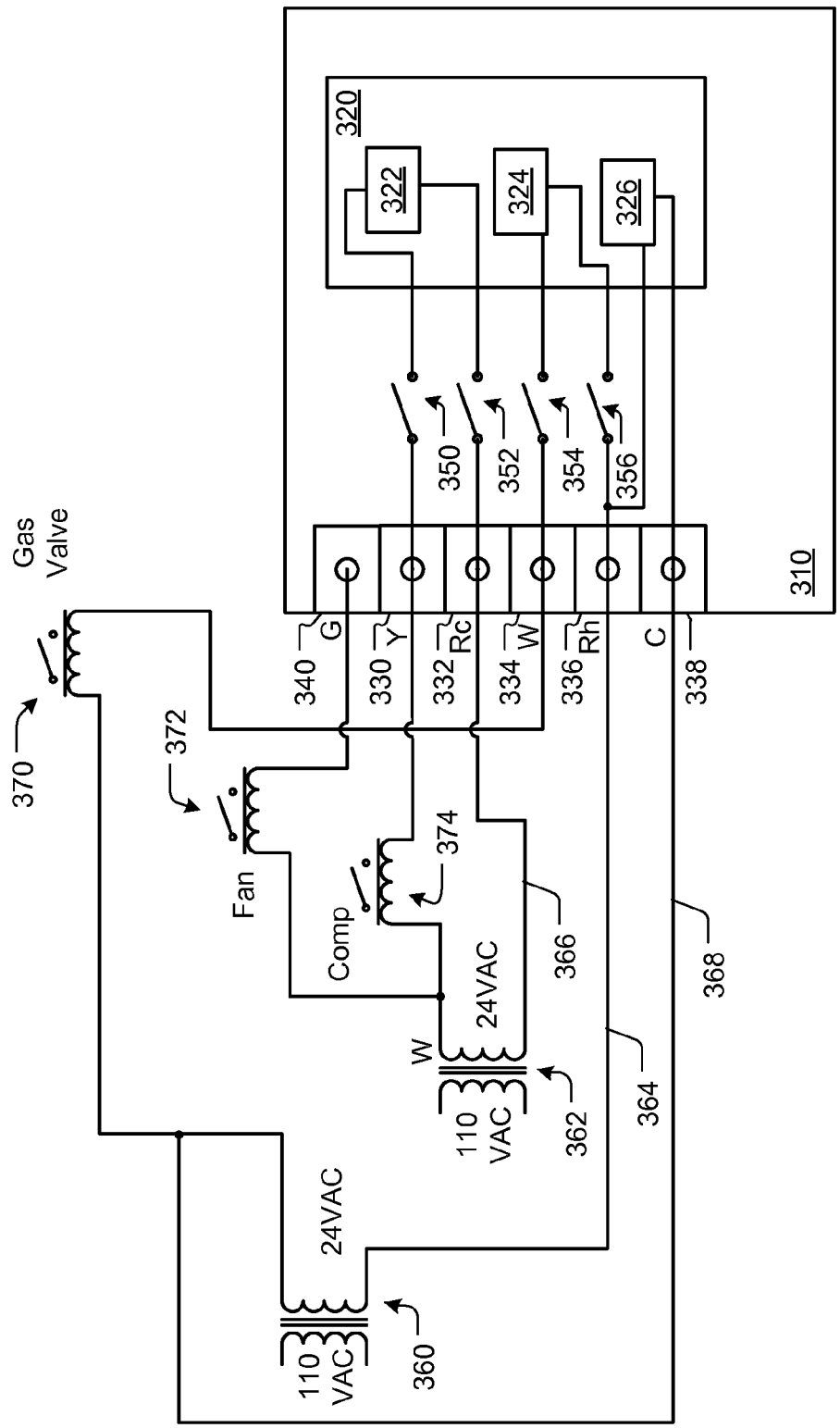

FIGS. 3A and 3B are schematic diagrams of a thermostat installed in an HVAC system not having an available common wire, and in an HVAC system having an available common wire, respectively, according to some embodiments. FIG. 3A shows a thermostat 310 wired for control to an HVAC system having two power transformers 360 and 362 and no common wire available to the thermostat. A two-transformer HVAC system is commonly found in residences and light commercial building in which an existing heating system was subsequently upgraded or had had an air conditioning system installed. Heat power transformer 360 converts 110 volt AC power to 24 volt AC power for the heating control circuit 364. Similarly, cooling power transformer 362 converts 110 volt AC power to 24 volt AC power for the cooling control circuit 366. Note that the 110 or 24 volt levels could be different, depending on the location of the building and/or what types of power is available. For example, the 110 volts could be 220 or 240 volts in some geographic locations.

Relay 370 controls the gas valve for the HVAC heating system. When sufficient AC current flows through the gas valve relay 370, gas in the heating system is activated. The gas valve relay 370 connected via a wire to terminal 334, which is labeled the "W" terminal, on thermostat 310. Relay 372 controls the fan for the HVAC heating and cooling systems. When sufficient AC current flows through the fan relay 372, the fan is activated. The fan relay 372 connected via a wire to terminal 340, which is labeled the "G" terminal on thermostat 310. Contactor (or relay) 374 controls the compressor for the HVAC cooling system. When sufficient AC current flows through the compressor contactor 374, the compressor is activated. The contactor 374 connected via a wire to terminal 330, which is labeled the "Y" terminal, on thermostat 310. The heat power transformer 360 is connected to thermostat 310 via a wire to terminal 336, which is labeled the "Rh" terminal. The cooling power transformer 362 is connected to thermostat 310 via a wire to terminal 332, which is labeled the "Rc" terminal. Note that unlike the HVAC system shown in FIG. 3B, the system shown in FIG. 3A has no common wire available to the thermostat 310.

Thermostat 310 has a number of components that are not shown. For further details of components of thermostat 310, according to some embodiments, see co-pending U.S. patent application Ser. No. 13/034,674 entitled "Thermostat Circuitry for Connection to HVAC Systems," and Ser. No. 13/034,678 entitled "Thermostat Battery Recharging During HVAC Function Active and Inactive States," filed Feb. 24, 2011, both of which are incorporated herein by reference. Thermostat 310 has power harvesting circuitry 320, including circuitry 322, 324 and 326 for harvesting power from the cooling control circuit 666, heating control circuit 364 and a common wire, which is not available in the HVAC system shown in FIG. 3A. Switches 350, 352, 354 and 356 are used to open and close the connection between the power harvesting circuitry 320 and the "Y" terminal 330, "Rc" terminal 332, "W" terminal 334 and "Rh" terminal 336 respectively. When there is not common wire connected to thermostat 310, as shown in FIG. 3A, the switches 350, 352, 354 and 356 are closed as shown, such that power harvesting circuitry 322 and 324 can operate to harvest power from the cooling control circuit 366 and from the heating control circuit 364.

FIG. 3B shows a thermostat 310 wired for control to an HVAC system having two power transformers 360 and 362, as shown in FIG. 3A, except that in this case a common wire 368 is available. The common wire 368 directly connects the HVAC heating transformer 360 and terminal 338 of thermostat 310. Since a common wire 368 is present, the thermostat 310 can draw power, via power harvesting circuitry 326 directly from the heating transformer 360 without any of the HVAC relays 370, 372, and 374 in the loop. Thus, drawing power from the common wire 368 is the preferred power source for thermostat 310. Accordingly, the switches 350, 352, 354 and 356 are opened such that power harvesting using circuitry 322 and 324 does not take place. According to some embodiments, as will be described more fully below, terminal connector 338 is adapted to automatically open the switches 350, 352, 354 and 356 upon connection of a common wire.

Note that although the HVAC systems shown in FIGS. 3A and 3B have two power transformers 360 and 362, the thermostat 310 can be used with HVAC systems having only a single power transformer. Further, the thermostat 310 can be used with an HVAC system having only a single HVAC function, such as only heating or only cooling. Further the thermostat 310 can be used with HVAC systems have more complex functionality such as multiple heating and/or cooling stages, and/or humidification and/or dehumidification.

Figure 4B:
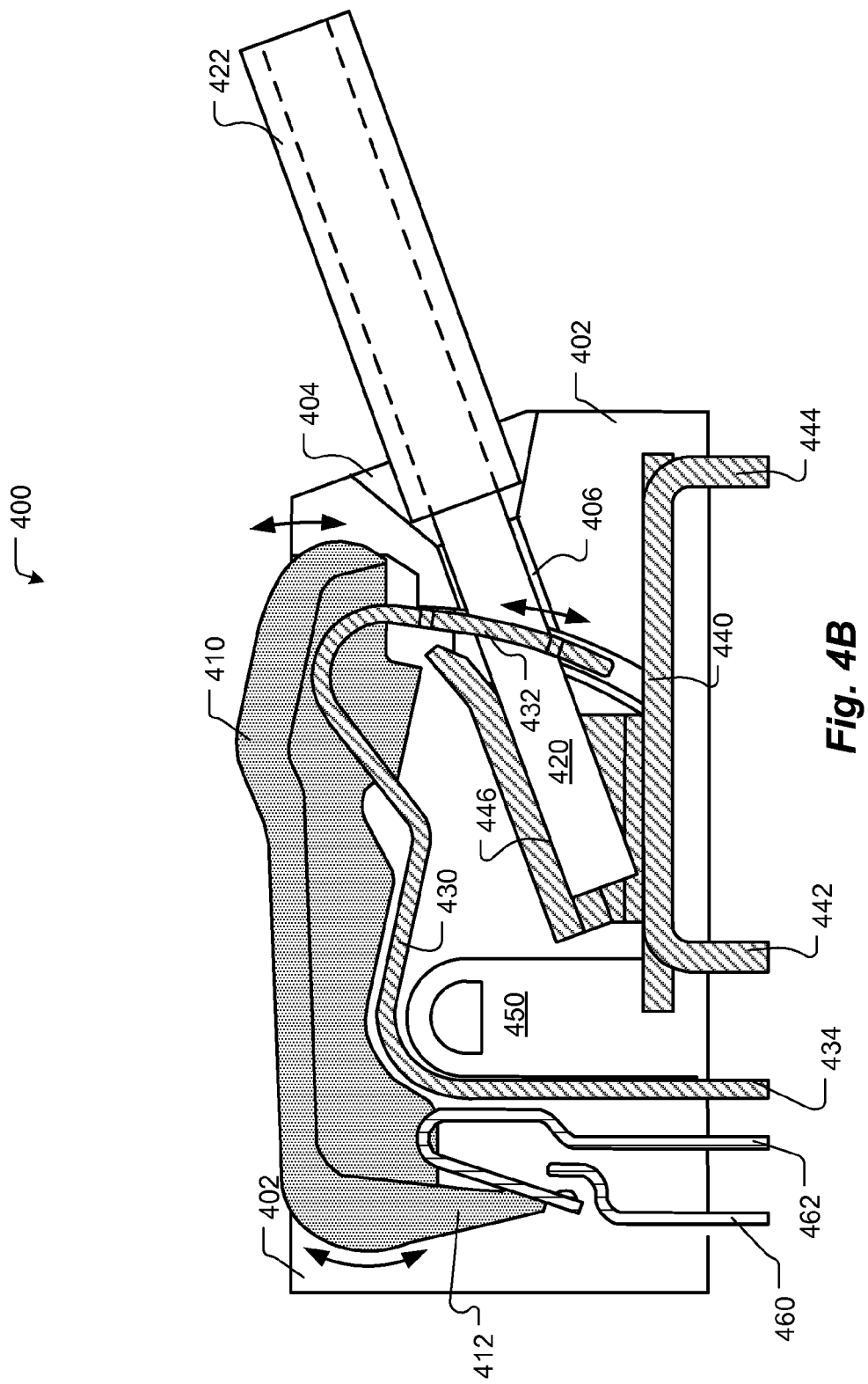
Figure 4C:
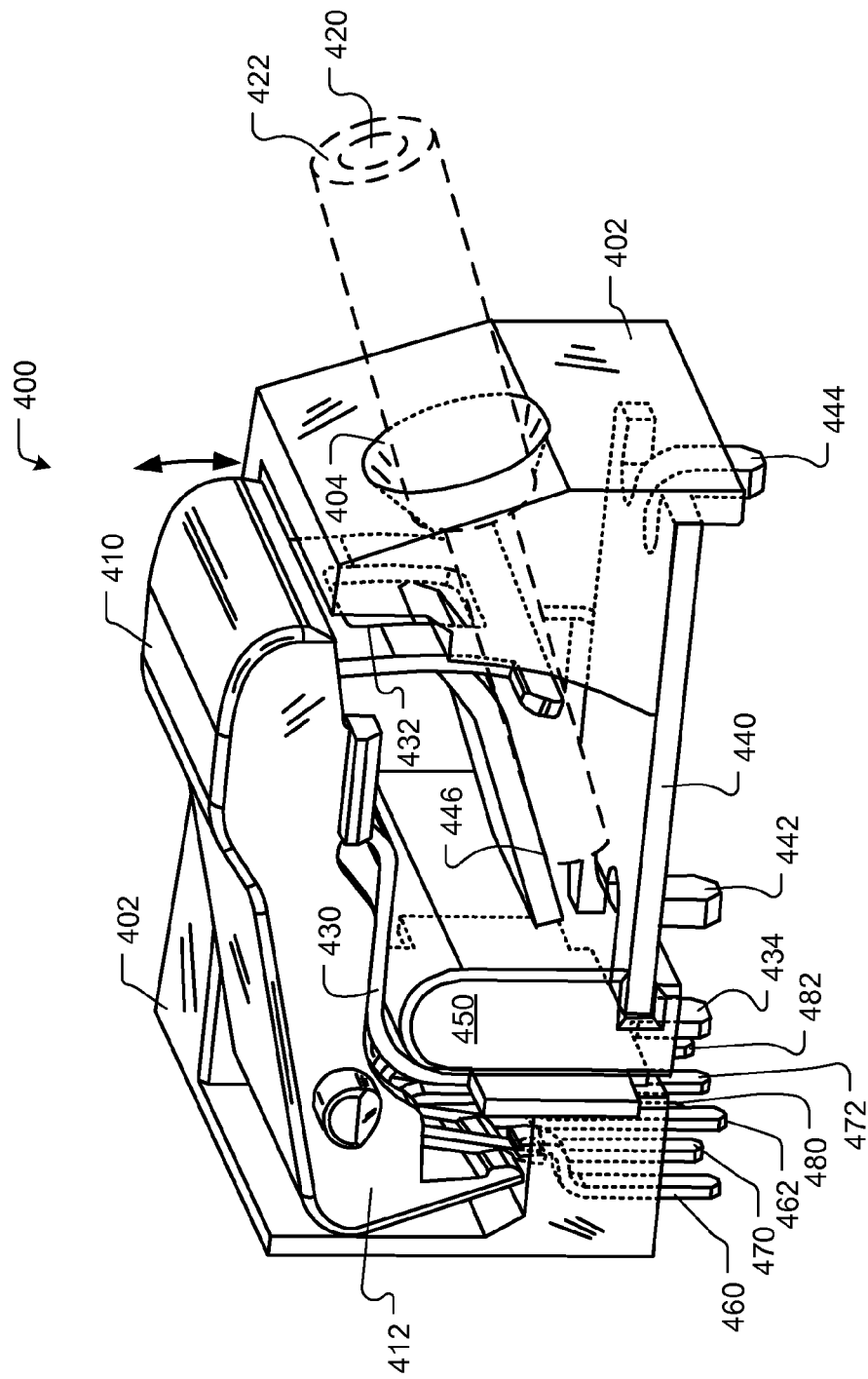

FIGS. 4A, 4B and 4C show a thermostat connector with automatic switching of independent circuits, according to some embodiments. FIG. 4A is a side view of the connector 400. The connector 400 has a body 402 that has a conical opening 404 and a cylindrical opening 406 which accepts an HVAC wire conductor (not shown). The connector 400 includes a push button 410 to actuate a first primary conductor 430. The first primary conductor 430 is made of metal is shaped so as to be stable in the position shown in FIG. 4A. The conductor 430 can be electrically connected to a circuit board via pin 434. The conductor 430 includes a window 432 that is shaped and dimensioned to accept an HVAC wire conductor when the window 432 is positioned so as to be aligned with the cylindrical opening 406. The window 432 can be translated down by applying downward force on the button 410 which deforms conductor 430 which pivots on fulcrum member 450. The conductor 430 has a spring force that tends to resist the downward force on button 410 to return the button 410 and the conductor 430 to return to the position shown in FIG. 4A. A second primary conductor 440 is fixedly mounted within the connector 400 and can be electrically connected to a circuit board using pins 442 and or 444. The conductor 440 is "C" shaped and has an upper flat angled portion 446 that will accept and make electrical contact with an HVAC wire conductor.

The connector 400 also includes one or more pairs of secondary conductors such as secondary conductor 460 and 462. The two conductors within each secondary conductor pair are in contact with one another when the there is no HVAC wire conductor inserted in connector 400, such as shown in the FIG. 4A. In FIG. 4A, the rear lever portion 412 of button 410 pushed on a portion of conductor 462 so as to be in electrical contact with conductor 460. The secondary conductors 460 and 462 are connected to a circuit board via the lower pin portions of each conductor. Thus, when an HVAC wire conductor is not inserted in the connector 400, as shown in FIG. 4A, the spring force of primary conductor 430 maintains pressure on button 410 which maintains contact between conductors 460 and 462 via lever portion 412.

FIG. 4B shows a side view of the connector 400 with an HVAC wire conductor 420 inserted, according to some embodiments. The HVAC wire conductor 420 has an insulated portion 422 that is striped away so as to expose a sufficient amount of conductor 420 for secure insertion and connection with connector 400. The wire conductor 420 is inserted as shown through the cylindrical opening of body 402 and through the window portion 432 of first primary conductor 430. The HVAC wire conductor 420 is also held in place by contacting the upper flat portion 446 of the second primary conductor 440. The spring force from the deformation of conductor 430 acts to urge the wire 420 into contact with both the lower portion of the window of conductor 430 and the lower surface of the upper flat portion 446 of conductor 440. The wire 420 is thus maintained securely in connector 400 and in electrical contact with both conductor 430 and conductor 440.

When an HVAC wire conductor is inserted in connector 400, as shown in FIG. 4B, the lever portion 412 of button 410 is positioned as shown such that the secondary conductors 460 and 462 are not in contact with one another. In particular, the conductor 462 is shaped such that it exerts a spring force towards the lever portion 412 and away from the upper portion of conductor 460. Thus, when the HVAC wire conductor is inserted in the connector 400 the contact between conductor 460 and conductor 462 is broken.

FIG. 4C is a perspective view of connector 400. Note that the position of button 410 and conductor 430 are shown as if an HVAC wire conductor is not inserted, although a wire conductor 420 is shown in broken lines for positional reference. For example, note that the window 432 of conductor 430 is not aligned with the conductor 420. Note that in FIG. 4C there are four pairs of secondary conductors, that are in a closed stated when a wire conductor is not inserted and in an open state when a wire is inserted. In FIG. 4C, secondary pairs 460-462, 470-472 and 480-482 are shown. The connector 400 thus acts to automatically actuate switches formed by each secondary conductor pair when an HVAC wire conductor is inserted. According to some embodiments, other numbers of pairs of secondary conductors are used with one or more connectors in the thermostat. For example, some connectors can have a single pair of secondary conductors, other connectors can have two pairs of secondary conductors, and yet other connectors can have three pairs, depending on the electrical design of the thermostat.

According to some embodiments, the connector 400 shown in FIGS. 4A, 4B and 4C is used in a thermostat to accept and make connection with a common wire, if available from the HVAC system where the thermostat is being installed. Power harvesting circuitry is connected to the four secondary conductor pairs, which is activated or used when there is no common wire inserted, and deactivated or not used when a common wire is inserted. In particular, according to some embodiments, the four secondary conductor pairs corresponds to the switches 350, 352, 354 and 356 as shown and described with respect to FIGS. 3A and 3B, and the connector 400 corresponds to the terminal 338 as shown and described with respect to FIGS. 3A and 3B.

Figure 5:
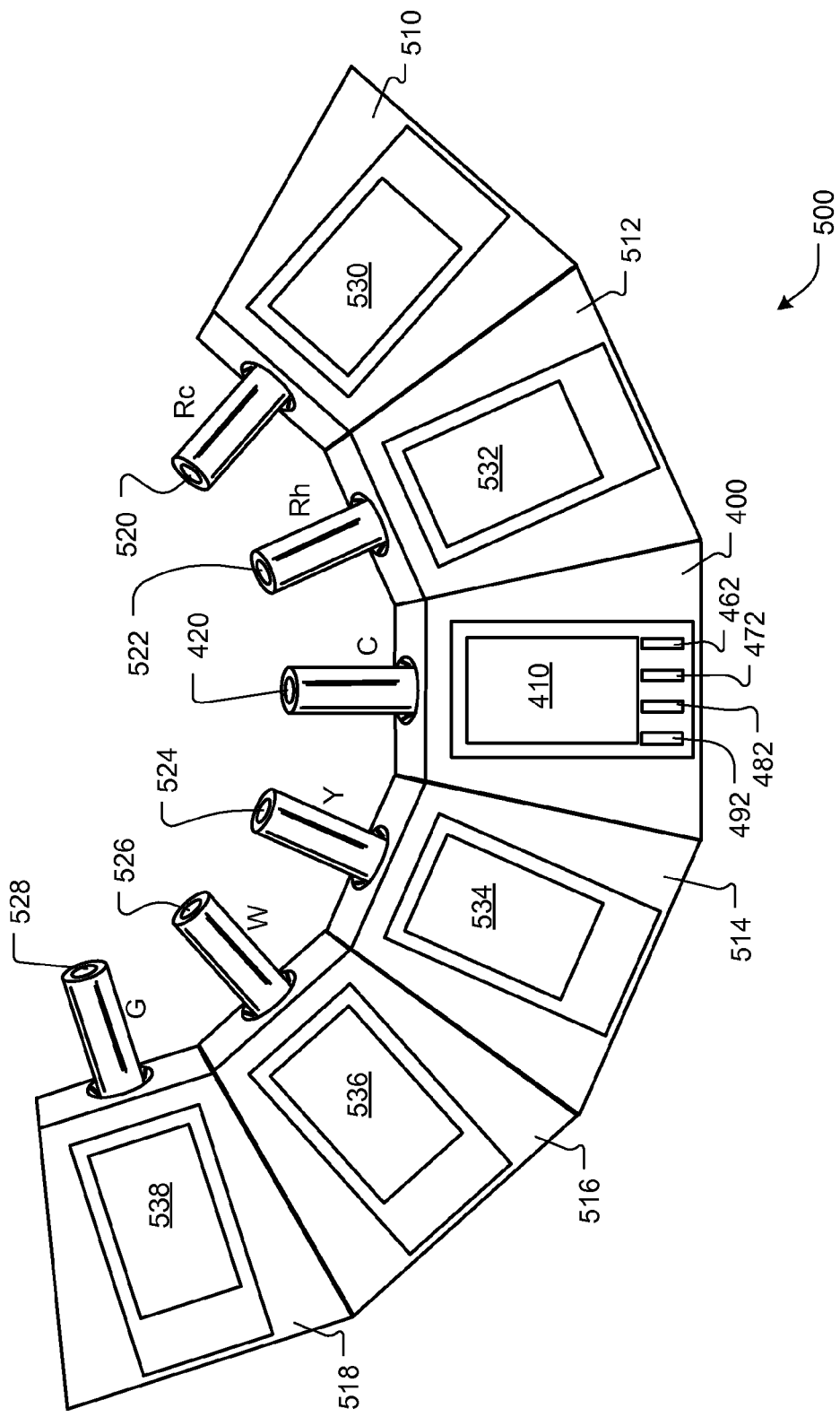
FIG. 5 shows a terminal block used for an HVAC thermostat, according to some embodiments.

FIG. 5 shows a terminal block used for an HVAC thermostat, according to some embodiments. Terminal block 500 is shown and includes terminals or connectors for accepting and making contact between the thermostat and up to 6 HVAC wire conductors. Connector 400 is shown with a button 410 and accepts an HVAC common wire 420, if available. The connector 410 also includes four automatically switched pairs of conductors of which conductors 462, 472, 482 and 492 are shown, although according to some embodiments, other numbers of pairs can be provided. Connectors 510, 512, 514, 516 and 518 are also part of terminal block 500, and accepts HVAC wires 520 (Rc), 522 (Rh), 524 (Y), 526 (W) and 528 (G), respectively, if available. The connectors 510, 512, 514, 516 and 518 also have buttons 530, 532, 534, 536 and 538, respectively and operate as shown in FIGS. 4A, 4B and 4C, except that no secondary switched pairs of conductors are included.

Figure 6A:
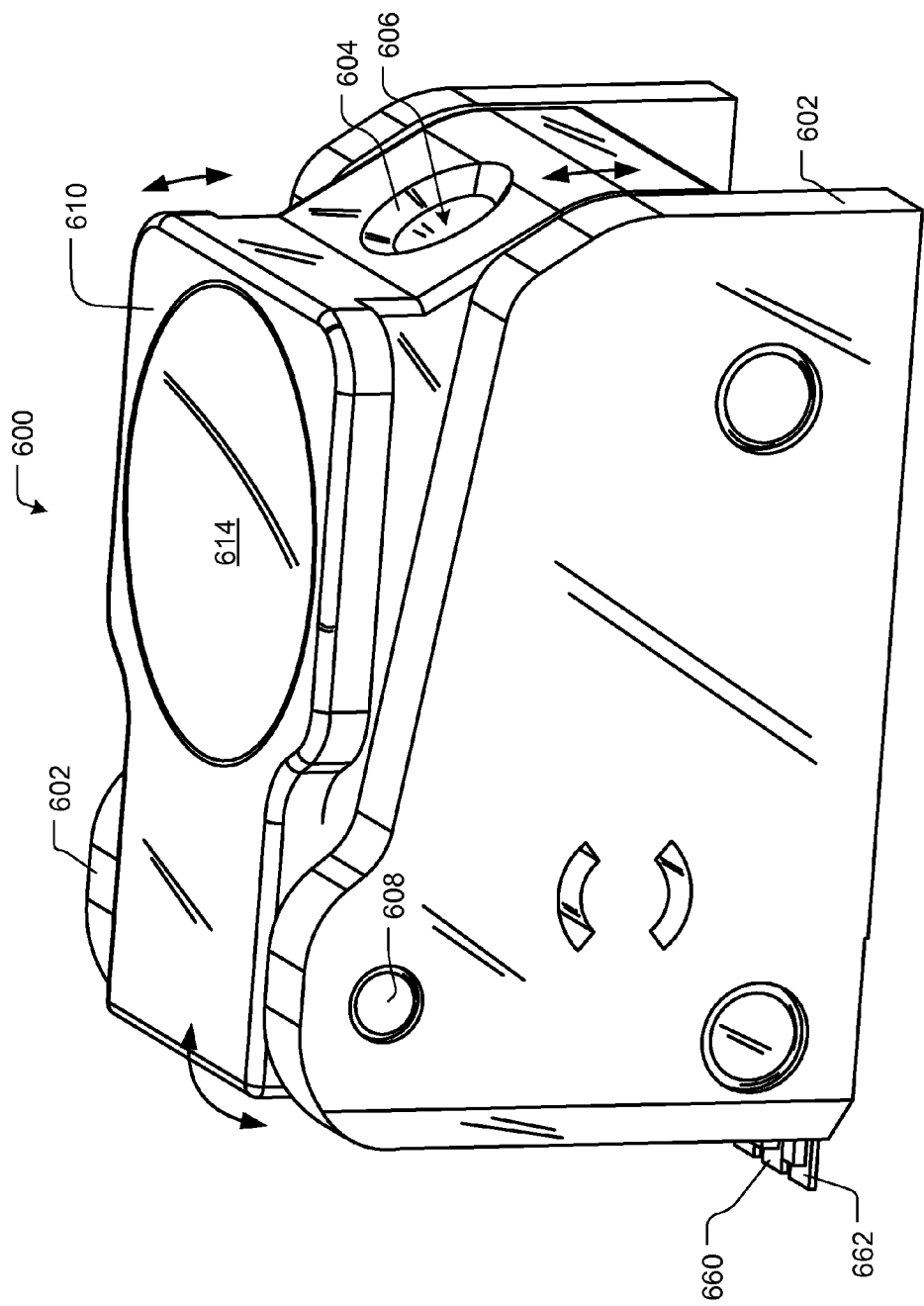
FIGS. 6A-B show a thermostat connector with automatic switching of independent circuits, according to some embodiments.
Figure 6B:
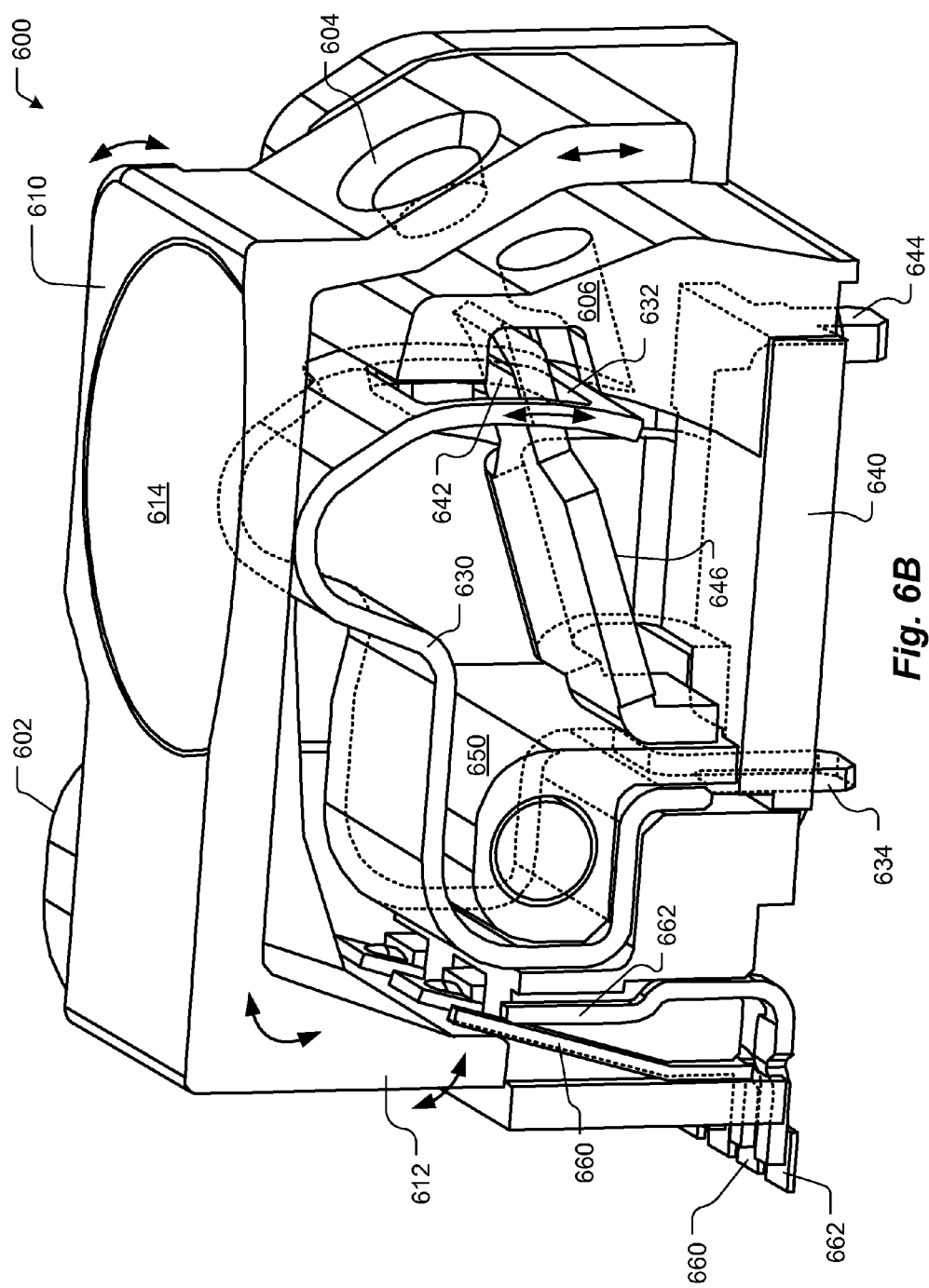

FIGS. 6A-B show a thermostat connector with automatic switching of independent circuits, according to some embodiments. FIG. 6A is a perspective view of the connector 600. The connector 600 has a body 602 that has a conical opening 604 and a cylindrical opening 606 which accepts an HVAC wire conductor (not shown). The connector 600 includes a push button 610 having a rounded depression 614. When button 610 is depressed the button pivots about axis 608, the opening 604 aligns with cylindrical opening 606 such that an HVAC wire can be accepted, and a lever (shown in FIG. 6B) disconnects electrical contact between secondary conductors 660 and 662.

FIG. 6B is a cut-away perspective view of connector 600. When button 610 is depressed the button pivots about an axis 608 (shown in FIG. 6A) and three actions take place. First the lever 612 moves rearward and electrical contact between three pairs of secondary conductors are opened such as pair of secondary conductors 660 and 662. Second, the button 610 pushes downward on a first primary conductor 630 and bends conductor 630 such that window 632 is aligned with the cylindrical opening 606. Third, the opening 604 aligns with cylindrical opening 606 such that an HVAC wire can be accepted through opening 606, window 632, and make contact with the upper surface 646 of a second primary conductor 640. Note that although three pairs of secondary conductors are shown in FIG. 6B, according to some embodiments other connectors on the same thermostat have other numbers of pairs of secondary conductors. According to some embodiments, some connectors have a single pair of secondary conductors and other connectors have two pairs of secondary conductors. Further, according to some embodiments, high current and/or high voltage capacity pairs of conductors can be provided by using wider and/or thicker conductors and contact areas. Finally, the pairs of secondary conductors shown are normally-closed, in that the conductors electrically contact each other unless the button 614 is actuated and a wire is inserted in the connector. However according to some embodiments, one or more of the pairs of secondary conductors can be normally open, such that the two secondary conductors do not electrically contact each other unless the button 614 is actuated and a wire is inserted.

The first primary conductor 630 is made of metal is shaped so as to be stable in the position shown in FIGS. 6A-B. The conductor 630 can be electrically connected to a circuit board via pin 634. The window 632 can thus be translated down by applying downward force on the button 610 which deforms conductor 630 which pivots on fulcrum member 650. The conductor 630 has a spring force that tends to resist the downward force on button 610 to return the button 610 and the conductor 630 to return to the position shown in FIGS. 6A-B. A second primary conductor 640 is fixedly mounted within the connector 600 and can be electrically connected to a circuit board using pin 644. The conductor 640 is "C" shaped and has an upper flat angled portion 646 that will accept and make electrical contact with an HVAC wire conductor. The conductor 640 also has a tongue member 642 that protrudes through the window 632 as shown. The design shown in FIGS. 6A-B has advantages over the design shown in FIGS. 4A-C. Firstly, the cylindrical opening 606 is only aligned with opening 604 when the button 610 is sufficiently depressed. This helps to ensure that electrical contact between the secondary pairs of conductors is open before electrical contact is made between the HVAC wire and either of the primary conductors 630 and 640. Secondly, the tongue member 642 helps to ensure that the conductor 630 is maintained in position and that the HVAC wire is guided into the proper position.

As in the case of connector 400 of FIGS. 4A-C, two secondary conductors are associated with each secondary conductor pair and are in electrical contact with one another when the there is no HVAC wire conductor inserted in connector 600. The secondary conductors 660 and 662 are connected to a circuit board via the lower pin portions of each conductor. Thus, when an HVAC wire conductor is not inserted in the connector 600, the spring force of primary conductor 630 maintains pressure on button 610 which maintains contact between conductors 660 and 662 via lever portion 612.

When an HVAC wire (not shown) is inserted, it passes through the conical opening 604, cylindrical opening 606, and through the window portion 632 of first primary conductor 630. The HVAC wire conductor is also held in place by contacting the upper flat portion 646 of the second primary conductor 640. The spring force from the deformation of conductor 630 acts to urge the HVAC wire into contact with both the lower portion of the window 632 of conductor 630 and the lower surface of the upper flat portion 646 of conductor 640. The HVAC wire is thus maintained securely in connector 600 and in electrical contact with both conductor 630 and conductor 640. Additionally, when an HVAC wire conductor is inserted in connector 600 the lever portion 612 of button 610 is positioned as shown such that the secondary conductors 660 and 662 are not in contact with one another. In particular, the conductor 662 is shaped such that it exerts a spring force towards the lever portion 612 and away from the upper portion of conductor 660. Thus, when the HVAC wire conductor is inserted in the connector 600 the contact between conductor 660 and conductor 662 is broken. The same action takes place in the other two pairs of secondary conductors such that the electrical connection in all three pairs of secondary conductors is broken by the pressing of button 610. The connector 600 thus acts to automatically actuate switches formed by each secondary conductor pair when an HVAC wire conductor is inserted.

Note that the primary conductors 630 and 640 are not normally in electrical contact with each other when there is no wire inserted, and when a wire is inserted, the two primary conductors 630 and 640 are electrically connected through the inserted wire. Thus, a normally-open switch is formed by the pair of primary conductors 630 and 640 which can be used for detection of electrical communication with an inserted wire, and/or high current applications, due to the relatively large contact surfaces on conductors 630 and 640.

According to some embodiments, the connector 600 shown in FIGS. 6A-B is used in a thermostat to accept and make connection with a common wire, if available from the HVAC system where the thermostat is being installed. Power harvesting circuitry is connected to the three secondary conductor pairs, which is activated or used when there is no common wire inserted, and deactivated or not used when a common wire is inserted. In particular, according to some embodiments, the three secondary conductor pairs corresponds to the switches 350, 352, 354 and 356 as shown and described with respect to FIGS. 3A and 3B, and the connector 600 corresponds to the terminal 338 as shown and described with respect to FIGS. 3A and 3B.

Figure 7A:
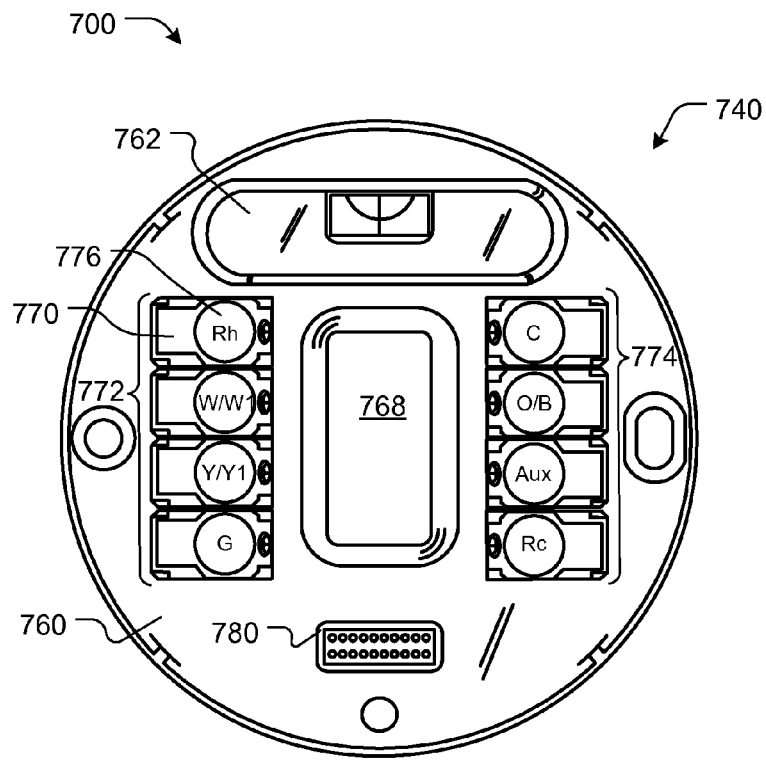
FIGS. 7A-B show an HVAC thermostat 700 having a backplate and a head unit, according to some embodiments.
Figure 7B:
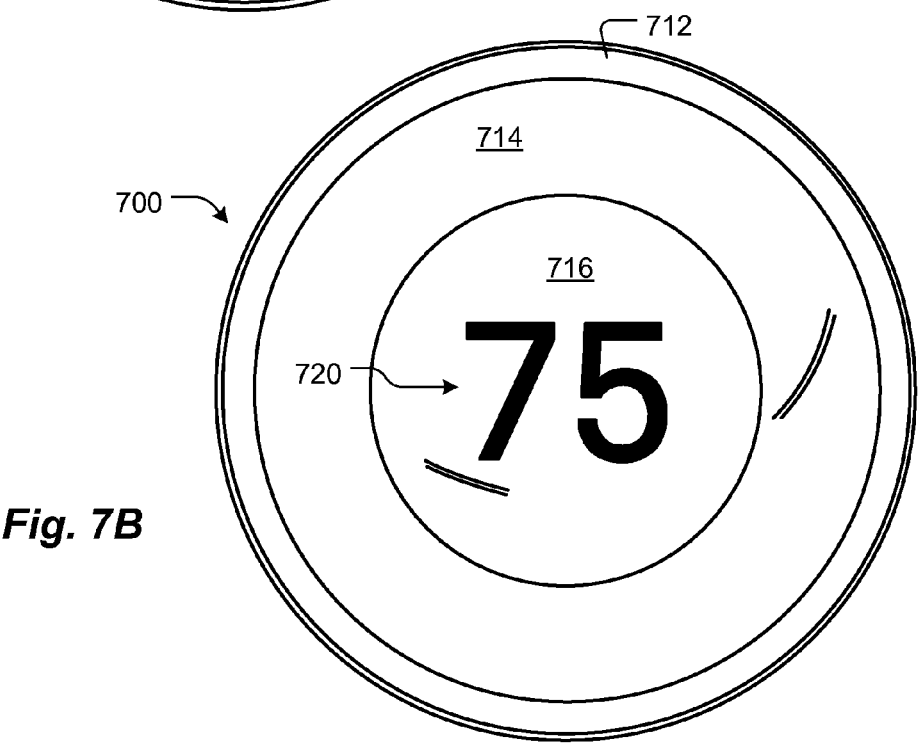

FIGS. 7A-B show and HVAC thermostat 700 having a backplate (FIG. 7A) and a head unit (FIG. 7B), according to some embodiments. In backplate 740, two terminal blocks 772 and 774 are shown and include terminals or connectors for accepting and making contact between the thermostat and up to 8 HVAC wire conductors. According to some embodiments, connector 770 corresponds to connector 400 and connector 600 as shown in and described with respect to FIGS. 4A-C and 6A-B respectively. Connector 770 has a button 776 and accepts an HVAC common wire, if available. The connector 770 also includes three automatically switched pairs of conductors as shown in and described with respect to FIGS. 4A-C and 6A-B. The other connectors in blocks 772 and 774, and accept other HVAC wires such as Y/Y1, W/W1, Aux, Rc, Rh, G and O/B, if available. The connectors have buttons and operate as shown in FIGS. 4A-C or FIGS. 6A-B, and according to some embodiments, include one or more pairs of secondary switched conductors. In particular, according to some embodiments, all of the connectors have at least one switched pair of secondary conductors that can be used, for example for the mechanical detection of the presence of a wire. Rh and Rc have two switched pairs of secondary conductors, one for detecting the presence of an inserted wire, and the other switched pair is used to turn off the power stealing from the other R terminal. According to some embodiments, other numbers of connectors are used for making connections to other numbers of HVAC wire conductors. For example, according to some embodiments connectors are provided for connection to seven additional HVAC wires, namely: W2 (second stage heating); Y2 (second stage cooling); E (heat pumps/emergency heating); HUM1 and HUM2 (humidifier terminals 1 and 2); and DEHUM1 and DEHUM2 (dehumidifier terminals 1 and 2).

Backplate 740 also includes, according to some embodiments, a bubble level 762, a connector block 780 for connection to the head unit, and a body 760 for housing electronics. FIG. 7B shows a front view of a head unit that has a large circular display 716, which can display central numerals such as 720 and other information to a user. The front cover 714 covers the display and the surrounding area. A rotating ring 712 surrounds the cover 714 and rotates to accept user input to thermostat 700.

FIGS. 7C-D illustrate further detail for terminal blocks, according to some embodiments. The left terminal block 772 in FIG. 7C includes connectors 770, 778, 782 and 784 for the HVAC wires Rh, W, Y and G, respectively. Similarly, the right terminal block 774 in FIG. 7D includes connectors 786, 788, 790 and 792 for the HVAC wires C, O/B, Aux and Rc, respectively. Each of the connectors in FIGS. 7C and 7D include either one, two or three pairs of secondary conductors, as is described with respect to FIGS. 6A-B. According to some embodiments, the connectors 778, 784, 788, 790 (for HVAC wires W, G, O/B and Aux, respectively) each have one pair of normally-closed secondary conductors which are used to detecting the presence of an HVAC wire connected to that terminal. For example, connector 778 has a single switched pair 752 used to detect the presence of an HVAC wire connected to the "W" terminal. According to some embodiments, connectors 770 and 792 (for Rh and Rc, respectively) each have two pairs of normally-closed switched pairs of conductors. Each of the connectors 770 and 792 has a larger switch (750 and 746, respectively) designed to accept higher current loads such that it can be used to provide an automatic jumper functionality, as is described below with respect to FIG. 8. Each of the connectors 770 and 792 also has a smaller pair of normally-closed secondary conductors which are used to detecting the presence of an HVAC wire connected to that terminal. For example, connector 770 has a smaller switched pair 748. According to some embodiments, connectors 782 and 786 (for Y and C, respectively) each have three switched pairs of secondary conductors, such as shown in FIG. 6B. The C and Y terminals have additional switched pairs such that selections can be made to connect and/or disconnect power stealing circuitry, according to some embodiments. For example, the connector 782 has three switched pairs of secondary conductors 754, 756 and 758.

Additionally, each connector shown in FIGS. 7C and 7D has a normally-open pair of conductors that make connection with the inserted HVAC wire, which correspond to primary conductors 630 and 640 in FIG. 6B. The normally-open pair of conductors can be used for electrical detection of the wire.

Figure 8:
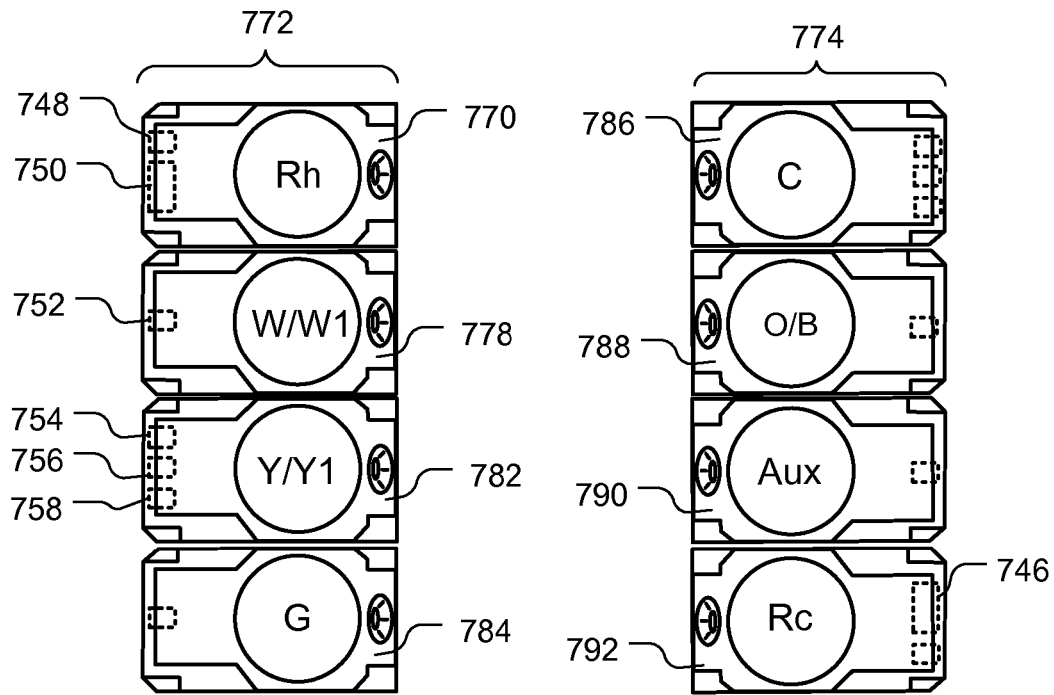
FIG. 8 is a schematic showing wiring for automatic jumpering for Rc and Rc terminals, according to some embodiments.
Figure 8:
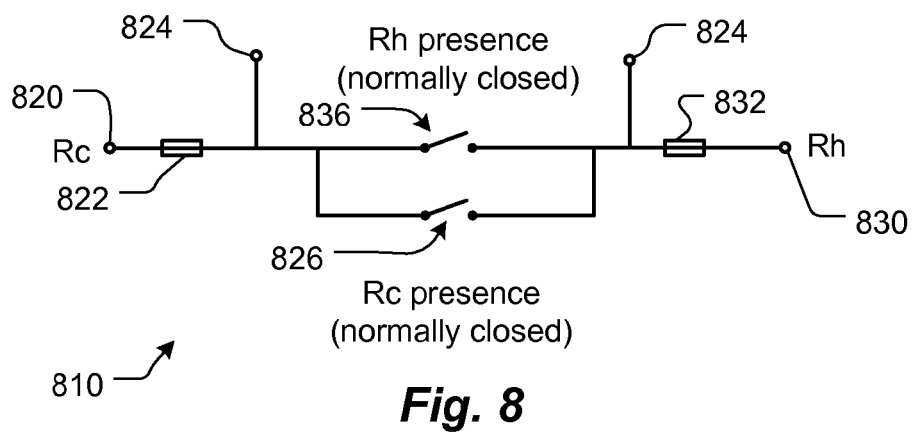

FIG. 8 is a schematic showing wiring 810 for automatic jumpering for Rc and Rc terminals, according to some embodiments. Terminal 820 is the Rc terminal and corresponds to, for example, connector 792 in FIG. 7D. A fuse 822 is included for protection of the circuit 810 and to other circuitry within the thermostat which is connected to terminal 824. A normally closed high current switch 826 is provided that is opened upon sensing the presence of an Rc wire. The switch 826, for example, corresponds to the switched secondary pair 746 in FIG. 7D. Terminal 830 is the Rh terminal and corresponds to, for example, connector 770 in FIG. 7C. A fuse 832 is included for protection of the circuit 810 and to other circuitry within the thermostat which is connected to terminal 834. A normally closed high current switch 836 is provided that is opened upon sensing the presence of an Rh wire. The switch 836, for example, corresponds to the switched secondary pair 750 in FIG. 7C. Thus if either Rc or and Rh wire is connected to the thermostat, but not both, then one of the switches will remain closed and the thermostat can control the HVAC functions using the Rc or Rh wire. However, if both Rc and Rh wires are connected (such as the case with an HVAC system having two power transformers) then both switches 826 and 836 are opened and the two wires Rc and Rh are automatically electrically isolated from each other, advantageously avoiding the use of manual jumpers, and avoiding high voltages associated with having both Rc and Rh wires electrically connected.

Figure 9C:
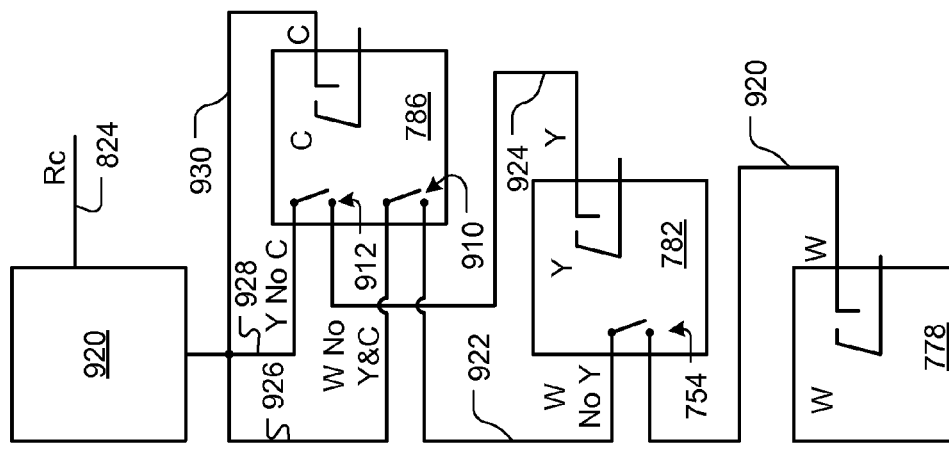
FIGS. 9A-C schematically illustrate the use of connectors being used to automatically select a source for power harvesting, according to some embodiments.
Figure 9B:
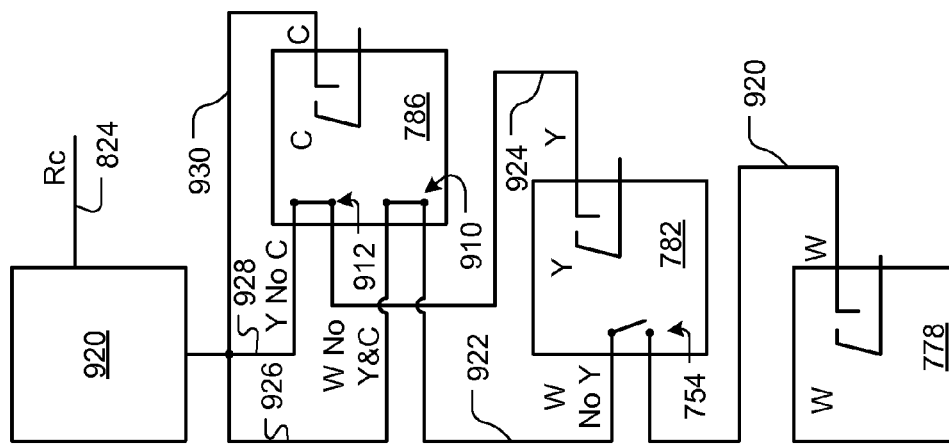
Figure 9A:
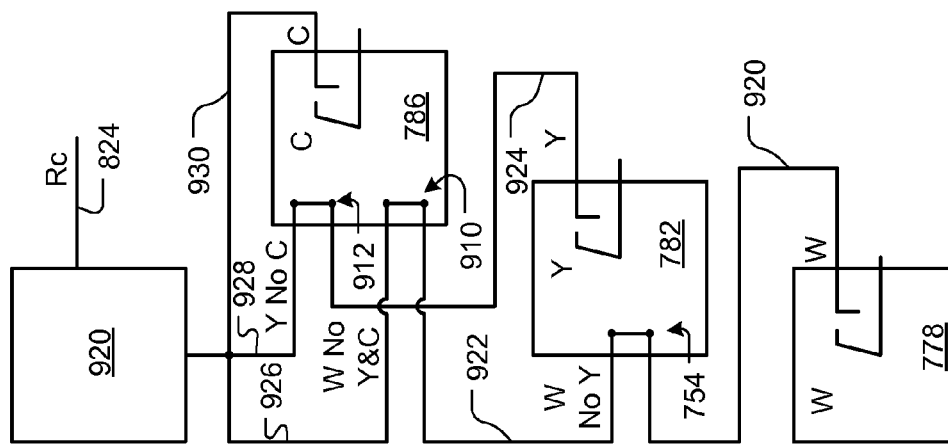

FIGS. 9A-C schematically illustrate the use of connectors being used to automatically select a source for power harvesting, according to some embodiments. The connectors 786, 783, and 778 are connectors as shown in and described with respect to FIGS. 7A, 7C and 7D. The connector 786 is used for connection to an HVAC "C" (common) wire and includes two switched pairs of normally closed secondary conductors 910 and 912. The connector 782 is used for connection to an HVAC "Y" (cooling) wire and includes one switched pair of normally closed secondary conductors 754. The connector 778 is used for connection to an HVAC "W" (heating) wire. Note that although not shown in FIGS. 9A-C, one or more additional pairs of switched secondary conductors can be provided with any of the connectors 786, 783 and 778, such as could be used for the purpose of electronically detecting the presence of an HVAC system wire to the connector. Power harvesting circuitry 920 is used to supply power to the thermostat and is also connected to the Rc wire 824 (or according to other embodiment the Rh wire).

FIG. 9A shows the case of the switches 754, 910 and 912 when no C wire and no Y wire is attached. In this case all of the switches 754, 910 and 912 are closed and the power harvesting circuitry 920 is connected with the W wire via circuit paths 920, 922 and 926. FIG. 9B shows the case of the switches 754, 910 and 912 when no C wire is attached but there is a Y wire attached. In this case switches 910 and 912 are closed but switch 754 is opened due to the presence of the Y wire. In this case the power harvesting circuitry 920 is connected with the Y wire via circuit paths 924 and 928. FIG. 9C shows the case of the switches 754, 910 and 912 when both C and Y wires are attached. In this case all the switches 754, 910 and 912 are open and the power harvesting circuitry 920 is connected with the C wire via circuit path 930. Note that the case of a connection of C and W wires and no Y wire is not shown but that in this case the W wire would not be connected to circuitry 920 since switch 910 would be open. Thus, through the use of circuitry and the connectors shown, the power harvesting circuitry is automatically switch so as to use connections to C, Y and W wires in decreasing order of priority. Preferably, the C wire is the highest priority as this ordinarily provides the best power source, if available. Note that according to some embodiments, the Y and W priorities are reversed to make W higher priority than Y.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A thermostat comprising a wiring terminal that includes a moveable component, the moveable component being actuatable so as to enable insertion of an HVAC system conductive wire within the wiring terminal to electrically connect the wiring terminal with the HVAC system conductive wire, the actuation of the moveable component opening a loop of an electrical circuit that does not include the HVAC system conductive wire, wherein the loop enables power harvesting.

2. The thermostat according to claim 1 wherein the loop includes an HVAC wire for a controlling at least part of a cooling system.

3. The thermostat according to claim 1 wherein the loop includes an HVAC wire for controlling at least part of a heating system.

4. The thermostat according to claim 1 wherein the HVAC system wire is a common wire.

5. The thermostat according to claim 4 wherein the loop includes an HVAC wire for controlling at least part of a heating and/or cooling system.

6. The thermostat according to claim 1 wherein the loop is used to detect the presence of the HVAC system wire.

7. The thermostat according to claim 1 further comprising a second wiring terminal and a third wiring terminal adapted and configured to make an electrical connection to further HVAC system conductive wires.

8. The thermostat according to claim 1 wherein the actuation of the moveable component switches a second loop of a second electrical circuit that does not include the HVAC system conductive wire.

9. The thermostat according to claim 1 wherein the thermostat is designed for controlling residential HVAC systems.

10. The thermostat according to claim 1 wherein the thermostat is designed for controlling light commercial HVAC systems.

11. A thermostat comprising a wiring terminal that includes a moveable component that is actuatable to enable insertion of an HVAC system common wire within the wiring terminal and to open a loop of an electrical circuit that does not include the HVAC system common wire, the loop being usable for harvesting power for the thermostat.

12. The thermostat according, to claim 11, the thermostat being further configured so that actuation of the moveable component switches open a second loop of a second electrical circuit that does not include the HVAC system common wire and that is useable for harvesting power for the thermostat.

* * * * *